United States Patent [19]

Herr et al.

[11] 3,909,645
[45] Sept. 30, 1975

[54] PERMANENT MAGNET MOTOR-TACHOMETER HAVING A SINGLE NON-FERROUS ARMATURE WOUND WITH TWO MUTUALLY-INSULATED WINDINGS EACH CONNECTED TO A SEPARATE COMMUTATOR

[75] Inventors: John A. Herr, Garwood; Wolfgang Jaffe, Roselle Park, both of N.J.

[73] Assignee: The Singer Company, New York, N.Y.

[22] Filed: July 10, 1974

[21] Appl. No.: 487,113

[52] U.S. Cl. .................... 310/138; 310/43; 310/140
[51] Int. Cl.[2] ........................................ H02K 23/58
[58] Field of Search ............ 310/43, 113, 112, 137, 310/138, 140, 261–265; 75/213

[56] References Cited
UNITED STATES PATENTS

| | | | |
|---|---|---|---|
| 829,801 | 8/1906 | Pratt et al. | 310/43 X |
| 994,058 | 5/1911 | Coates | 310/265 |
| 1,059,351 | 4/1913 | Conklin | 310/265 |
| 2,332,877 | 10/1943 | Villard | 310/265 X |
| 2,717,321 | 9/1955 | Stearns | 310/138 |
| 3,424,578 | 1/1969 | Strnat et al. | 75/213 |
| 3,436,573 | 4/1969 | Persson | 310/113 |
| 3,638,055 | 1/1972 | Zimmerman | 310/43 |

*Primary Examiner*—Donovan F. Duggan
*Attorney, Agent, or Firm*—Marshall J. Breen; Robert E. Smith; Edward L. Bell

[57] ABSTRACT

A structure for a permanent magnet motor-tachometer is disclosed wherein a single, non-ferrous, slotted armature rotating in a flux field supplied by permanent magnets is wound in the same slots with two mutually insulated windings each of which is connected to a separate commutator at opposite ends of the armature. Due to the absence of magnetic material in the armature, coupled with the low permeability of the permanent magnets, the two windings are essentially magnetically isolated and there is little or no transformer action between the two windings.

5 Claims, 3 Drawing Figures

U.S. Patent    Sept. 30,1975    3,909,645

PERMANENT MAGNET MOTOR-TACHOMETER HAVING A SINGLE NON-FERROUS ARMATURE WOUND WITH TWO MUTUALLY-INSULATED WINDINGS EACH CONNECTED TO A SEPARATE COMMUTATOR

FIELD OF THE INVENTION

This invention relates to the structure of permanent magnet motor-tachometers wherein the motor and tachometer are closely mechanically coupled on a single armature for accurate and fast-response speed governing but wherein the magnetic coupling between the motor and tachometer windings is minimized to prevent current pulsation in the motor winding from producing voltage ripple in the tachometer winding and thus falsely modifying the speed signal therefrom.

DESCRIPTION OF THE PRIOR ART

Motor-tachometers are known in which separate motor and tachometer armatures are spaced on a drive shaft. In effect, the motor and tachometer are elastically coupled through the deflectable shaft so that the tachometer speed change may lag the motor speed change which is undesirable in a high-performance servo system and may produce objectionable resonance. In order to overcome the objectionable elastic coupling effect between the seperate motor and tachometer structure above noted it is a known technique to wind both motor and tachometer windings in the same slots of a common conventional iron armature. However, this technique results in objectionable magnetic coupling between the two windings wherein current pulsations in the motor winding produce voltage ripple in the tachometer winding which is erroneously interpreted as a speed change.

It is also known in the prior art, as shown specifically in the Henry-Bandot U.S. Pat. No. 3,109,114, to use separate radially-spaced windings on the surface of a thin insulated disc armature rotating in a double air-gap. While it is possible to use one of these surface windings as a tachometer winding, it is not possible, as a practical matter, to find space enough on the disc surface to place a sufficient number of conductors to produce a voltage output per R.P.M. characteristic which is of sufficient gradient or slope to provide speed-change detection which is adequate for most applications. This serious limitation which is inherent in all surface-wound rotors, is, of course, not present in the structure according to the present invention wherein the slots formed in the cylindrical armature afford adequate space for stacking conductors in the number sufficient to provide a voltage per R.P.M. slope which is steep enough to insure sensitive speed-change detection for all applications. Thus, motor-tachometers constructed in accordance with the teachings of the present invention show a significant improvement in respect to the voltage gradient of the tachometer as compared with the prior art construction represented by the U.S. Pat. No. 3,109,114.

Thus, insofar as we are aware, the present state of the art is such that, as a practical matter, a choice must be made between either (1) motor-tachometer structure having desirable rigid mechanical coupling and objectionable magnetic coupling or (2) motor-tachometer structure having desirable low magnetic coupling and objectionable elastic mechanical coupling. It is the purpose of this invention to provide a motor-tachometer which combines in a single structure the advantages of rigid mechanical coupling and low magnetic coupling.

SUMMARY OF THE INVENTION

According to the present invention, it has been found that, by using rare-earth-alloy permanent magnets to supply the field flux in a single air gap, a practical motor-tachometer structure can be made in which a single slotted non-magnetic armature, rotating in said single air-gap, contains in the same slots a motor winding and, insulated therefrom, a tachometer winding. Each winding is connected to its own commutator located at opposite ends of the structure. The single armature provides rigid mechanical coupling between motor and tachometer while the absence of iron in the armature coupled with the low permeability of the rare-earth-alloy magnets reduces the magnetic coupling between the motor and tachometer windings so that there is essentially no transformer effect between them. In this manner, the advantages found heretofore only in two mutually exclusion prior art structures are combined in one structure in accordance with the present invention.

DETAILED DESCRIPTION OF THE INVENTION

Figure 1:
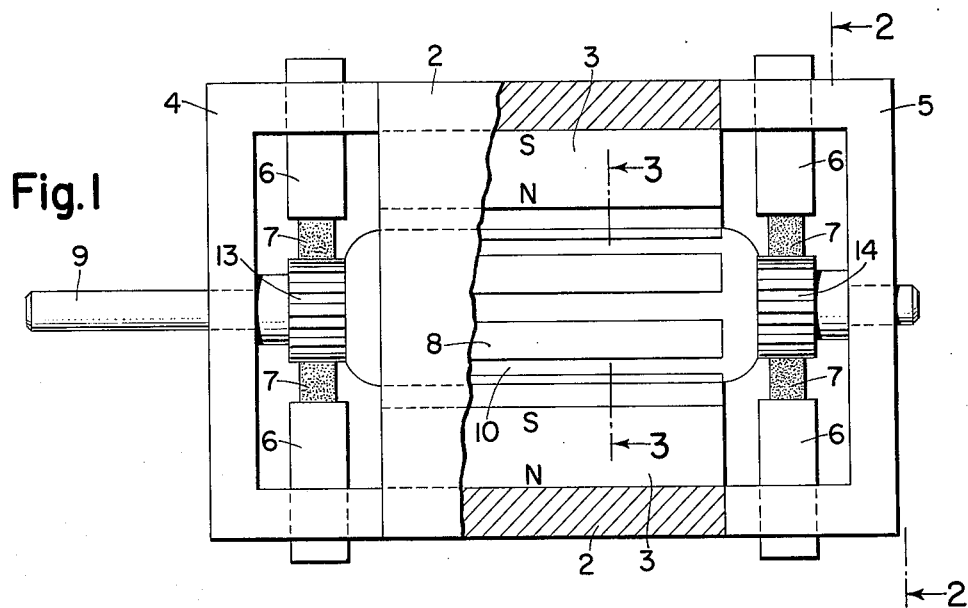
FIG. 1 is a longitudinal elevational view partially in section of a motor-tachometer structure embodying this invention.

Referring now to FIG. 1, a yoke 2, made of magnetically permeable material, forms with block-shaped permanent-magnets 3—3 the field structure for the motor-tachometer of the present invention. These magnets 3—3 are secured to the yoke 2 as shown by epoxy cement and are preferably made of rare-earth-alloys and especially those sold under the trade name "Lanthanet".

Each magnet 3 is magnetized across the small dimension and they are assembled in relatively opposing relation so that the inner faces of the magnets present to the armature preferably flat salient poles of alternately opposite polarity as shown by the letters N, S in FIG. 1 and form the single air-gap for the motor-tachometer.

The term "single air-gap" as used in this specification shall be understood to mean the non-magnetic space in which the magnetic flux flows in completing its closed path between two stationary magnetic poles. Thus, the term "single air-gap" distinguishes the structure of the present invention from prior art structures wherein the armature is in the form of a thin disc or a thin annular drum in which the magnetic field flux must traverse two air gaps (double air-gap) in completing a closed path between two stationary magnetic poles.

Secured to the opposite ends of the yoke 2 by any suitable means are end-bells 4 and 5, preferably made of non-magnetic material. As shown best in FIG. 2, the end-bells 4 and 5 may take the form of simple U-shaped straps placed cross-wise of the field axis F-F and support insulated brush boxes 6—6 with brushes 7—7 in conventional manner so that the two brush axes are aligned with the neutral axis B—B and are substantially normal to the field axs F—F.

Figure 2:
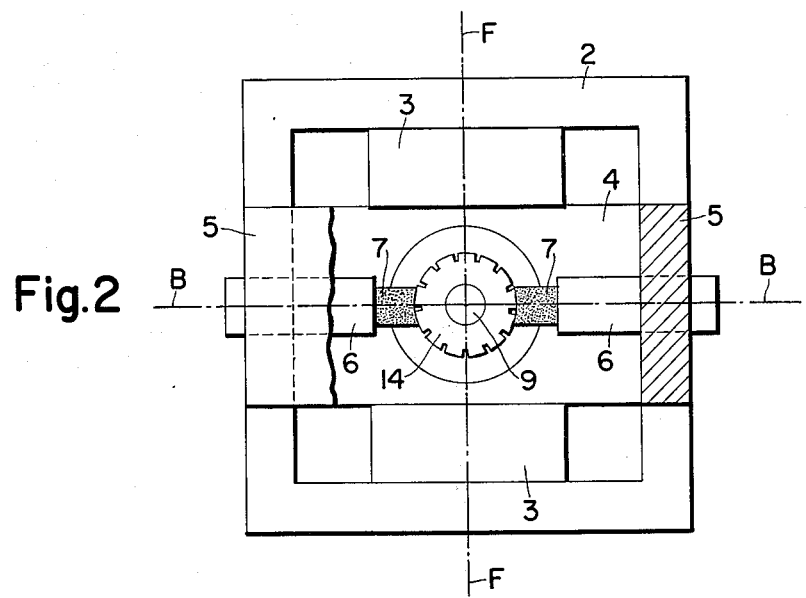
FIG. 2 is a partial section taken on line 2—2 of FIG. 1.

It will be noticed that, in FIG. 1, the end-bells 4 and 5 have been purposely rotated by 90° from their proper positions shown in FIG. 2 in order better to illustrate the details of their construction.

It will be understood that the yoke 2 function as a low-reluctance closed return path for the flux supplied by the magnets 3—3 and produces in the air-gap between the poles N–S a constant flux field of high flux density due to the inherently large coercive force of the magnets 3—3.

Located centrally of the air-gap described above is a cylindrical armature 8 which may be made of any suitable non-magnetic material. However, it is preferable, for the purposes of the present invention, to make the armature 8 of light-weight molded plastic insulating material with a rotor shaft 9 (preferably non-magnetic) molded integrally therein. The shaft 9 is journalled for rotation in any suitable axially aligned bearing means located in each of the end-bells 4 and 5. This structure provides rigid positional stability for the armature 8 in the air-gap and affords maximum torque transmission to the shaft 9.

Figure 3:
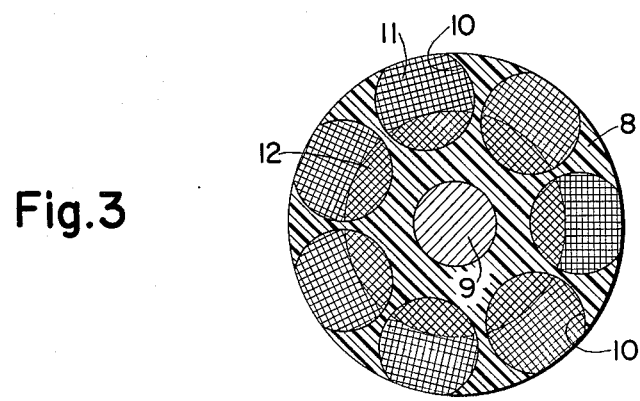
FIG. 3 is a detailed section of the armature taken on line 3—3 of FIG. 1.

As shown best in FIG. 3, the non-magnetic armature 8 is formed with longitudinal peripherally-spaced slots 10 in which slots are distributed both a motor winding 11 and a tachometer winding 12. The motor winding 11 is designed to convert electrical power to a mechanical form and because of this power handling requirement it is of large wire size and is characterized by low resistance. Howver, the tachometer winding 12 functions only to provide a signal voltage without any significant power capability and can therefore be made using a relatively fine wire size. While the motor and tachometer windings 11 and 12 may be wound simultaneously in which case the fine wire of the tachometer winding 12 could occupy the interstics between turns of the large wires of the motor winding 11, it is preferable, for the purposes of the present invention, to first wind the fine wire of the tachometer winding 12 into the bottom portion of the slots 10 and then wind the large wire of the motor winding 11 into the remaining and larger top portion of the slots 10 as shown in FIG. 3. In this manner the motor winding conductors occupy the outer portion of the slots 10 where their torque producing capability per unit current is greater than if they occupied the bottom portion of the slots 10.

In any case the motor winding 11 and the tachometer winding 12 occupy the same slots and are electrically insulated from each other. Referring again to FIG. 1, the motor winding 11 is connected to a conventional commutator 13 secured to the shaft 9, and the tachometer winding 12 is connected to a separate conventional commutator 14 secured to the shaft 9.

Thus, electrical power flows in through the brushes 7—7 supported by end-bells 4 through commutator 13 and through motor winding 11 and develops a torque and mechanical power to a load (not shown) connected to shaft 9. At the same time, an electrical voltage proportional to the rotational speed of shaft 9 is generated in the tachometer winding 12 and is applied through commutator 14 to brushes 7—7 supported by end-bell 5.

Inasmuch as the motor winding 11 and the tachometer winding 12 occupy the same slots 10 in a common armature 8 they are rigidly mechanically coupled so that any change in the motor speed is immediately detected without lag as a change in the tachometer voltage and eliminates the disadvantage of prior art structure wherein the motor and tachometer are elastically coupled through a deflectable shaft.

As seen best in FIG. 2, the magnetomotive forces due to currents in the motor winding 11 and in the tachometer winding 12 act substantially along the neutral axis B—B. These magnetomotive forces produce little if any mutual flux linking both windings because, due to the non-magnetic nature of the armature 8 and to the low permeability of the magnets 3—3, the path for such flux is of very high reluctance. Thus the motor winding 11 and the tachometer winding 12, although being mechanically rigidly coupled together, are essentially isolated magnetically from each other. As discussed above, both of these factors are desirable and they are successfully combined in the unique single non-ferrous armature structure of the present invention.

Other modes of applying the principle of the invention may be employed, change being made as regards the details described provided the features stated in any of the following claims, or the equivalents of such, are employed.

We claim:

1. A motor-tachometer comprising a permanent-magnet field formed with a single air-gap, a single non-magnetic cylindrical armature mounted for rotation in said air-gap, peripherally-spaced slots formed in said armature, a motor winding and a mutually insulated tachometer winding wound in the same armature slots, said windings being connected to separate commutators located on opposite ends of the armature.

2. A motor-tachometer according to claim 1 in which said peripherally spaced slots are formed substantially parallel to the axis of rotation of said armature.

3. A motor-tachometer according to claim 1 in which the tachometer winding occupies only the bottom portion of the slots and the motor winding occupies only the top portion of the slots.

4. A motor-tachometer according to claim 1 in which the field structure comprises salient poles of low-permeability permanent magnet material facing said armature.

5. A motor-tachometer according to claim 4 in which said poles are made of rare-earth alloys.

* * * * *